United States Patent [19]
Payne

[11] Patent Number: 5,322,551
[45] Date of Patent: Jun. 21, 1994

[54] FLUID SLUG FLOW MITIGATION WITH PARTITIONED PIPE

[75] Inventor: Richard L. Payne, McKinney, Tex.

[73] Assignee: Atlantic Richfield Company, Los Angeles, Calif.

[21] Appl. No.: 44,993

[22] Filed: Apr. 7, 1993

[51] Int. Cl.⁵ .............................................. B01D 19/00
[52] U.S. Cl. ....................................... 96/189; 96/190; 96/197; 96/15; 137/207; 138/37; 366/267
[58] Field of Search ..................... 95/260, 262; 96/189, 96/197, 198, 204, 215, 220, 190; 166/267; 137/207; 138/26, 37, 39, 42; 366/337

[56] References Cited

U.S. PATENT DOCUMENTS

| | | | |
|---|---|---|---|
| 3,384,169 | 5/1968 | Leonard | 166/267 X |
| 3,385,031 | 5/1968 | McMinn | 96/215 X |
| 3,406,947 | 10/1968 | Harder | 366/337 |
| 3,846,229 | 11/1974 | Kallmes | 138/42 X |
| 4,232,710 | 11/1980 | Gallo et al. | 138/37 X |
| 4,824,614 | 4/1989 | Jones | 138/37 X |

Primary Examiner—Charles Hart
Attorney, Agent, or Firm—Michael E. Martin

[57] ABSTRACT

Slug flow is substantially prevented in cylindrical pipes and other conduits by placing a generally flat plate partition extending within the pipe and dividing the pipe into a gas flow space and a liquid flow space. The position of the partition and the cross-sectional flow areas of the gas flow space and the liquid flow space are determined by predetermining that the pressure losses of gas flow and liquid flow should be substantially equal.

3 Claims, 2 Drawing Sheets 5,322,551

FLUID SLUG FLOW MITIGATION WITH PARTITIONED PIPE

BACKGROUND OF THE INVENTION

1. Field of the Invention

The present invention pertains to mitigating fluid slug flow with an internal flat plate type partition which will prevent slug flow from occurring in horizontal or near horizontal pipelines.

2. Background

Multi-phase fluid flow often occurs in oil production wells, particularly when the oil reservoir becomes depleted or when gas is injected into the reservoir as a drive or production stimulation fluid. The result is combined gas and liquid flow from the well to the fluid handling and treatment facilities. What also occurs is what is known as slug flow through the fluid gathering and distribution conduits and treatment vessels. Slug flow is known to cause a variety of mechanical, process and corrosion problems in oil field facilities and the phenomenon is particularly recurrent in remote or offshore production facilities where long, relatively large-diameter pipelines are in service.

Several inventions have been developed to mitigate slug flow in oil and gas production wells and related gathering and distribution systems. U.S. patent application Ser. No. 07/941,615, filed Sep. 8, 1992 to Richard L. Payne and U.S. patent application Ser. No. 08/023,280, filed Feb. 26, 1993 to Richard L. Payne, et al, both assigned to the assignee of the present invention, describe slug mitigation systems for oil and gas production and distribution facilities. However, there has been a continuing need for relatively uncomplicated slug mitigation devices which may be pre-installed in conduits for fluid gathering and distribution systems when it is anticipated that slug flow may occur at some time during the life of the system. It is to this end that the present invention has been developed.

SUMMARY OF THE INVENTION

The present invention provides a unique slug flow mitigation device, particularly adapted for use in horizontal or near horizontal pipelines and similar multiphase fluid flow conduits.

In accordance with one aspect of the present invention, a horizontal or near horizontal pipe adapted for conducting both gas and liquid flow is modified to minimize slug flow by the placement of a partition extending generally horizontally across the interior of the pipe and being placed within the pipe in such a way that gas will flow through an upper flow passage defined by the pipe and the partition and liquid will flow through a lower flow passage defined by the remainder of the pipe and the partition. The partition is placed in such a way as to provide for substantially equal pressure losses in the gas flowpath and the liquid flowpath. The partition may extend the entire length of the pipe in which slug flow is otherwise expected or the partition may extend over a predetermined length of the pipe.

The invention is mechanically uncomplicated and prevents fluid slug flow from occurring in horizontal or substantially horizontal pipelines. The structure required is a minor modification of conventional cylindrical pipe and may be of a relatively low-strength material since it is not a pressure-bearing surface, but only exists to provide an interface between the gas flow and liquid flow through the pipe. Use of the partitioned pipe in accordance with the present invention may allow the use of larger diameter fluid flowlines than would otherwise be permitted due to the problems associated with slug flow which otherwise would occur in relatively large-diameter conduits. Moreover, the slug mitigation device of the present invention is particularly useful in oil and gas production facilities for both onshore and offshore or subsea pipelines which carry both liquid and gas.

Those skilled in the art will recognize the above-mentioned features and advantages of the present invention, together with other superior aspects thereof, upon reading the detailed description which follows in conjunction with the drawing.

BRIEF DESCRIPTION OF THE DRAWING

FIG. 4 is a diagram showing the flow conditions which typically produce slug flow in closed conduits and the like.

DESCRIPTION OF PREFERRED EMBODIMENTS

Figure 1:
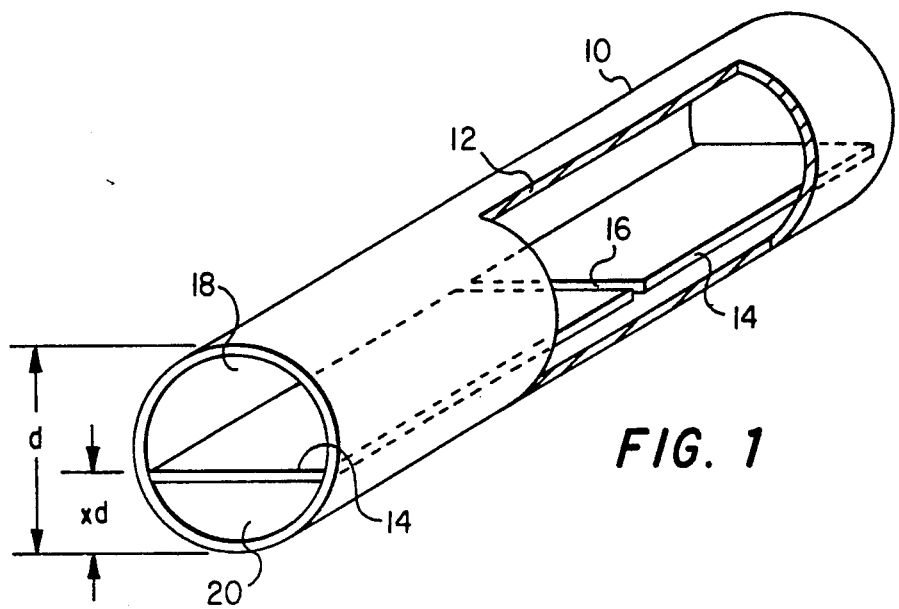
FIG. 1 is an isometric view of a section of fluid conduit showing the slug flow mitigation partition in accordance with the present invention.

In the description which follows, like parts are marked throughout the specification and drawing with the same reference numerals, respectively. The drawing figures are not necessarily to scale.

Figure 4:
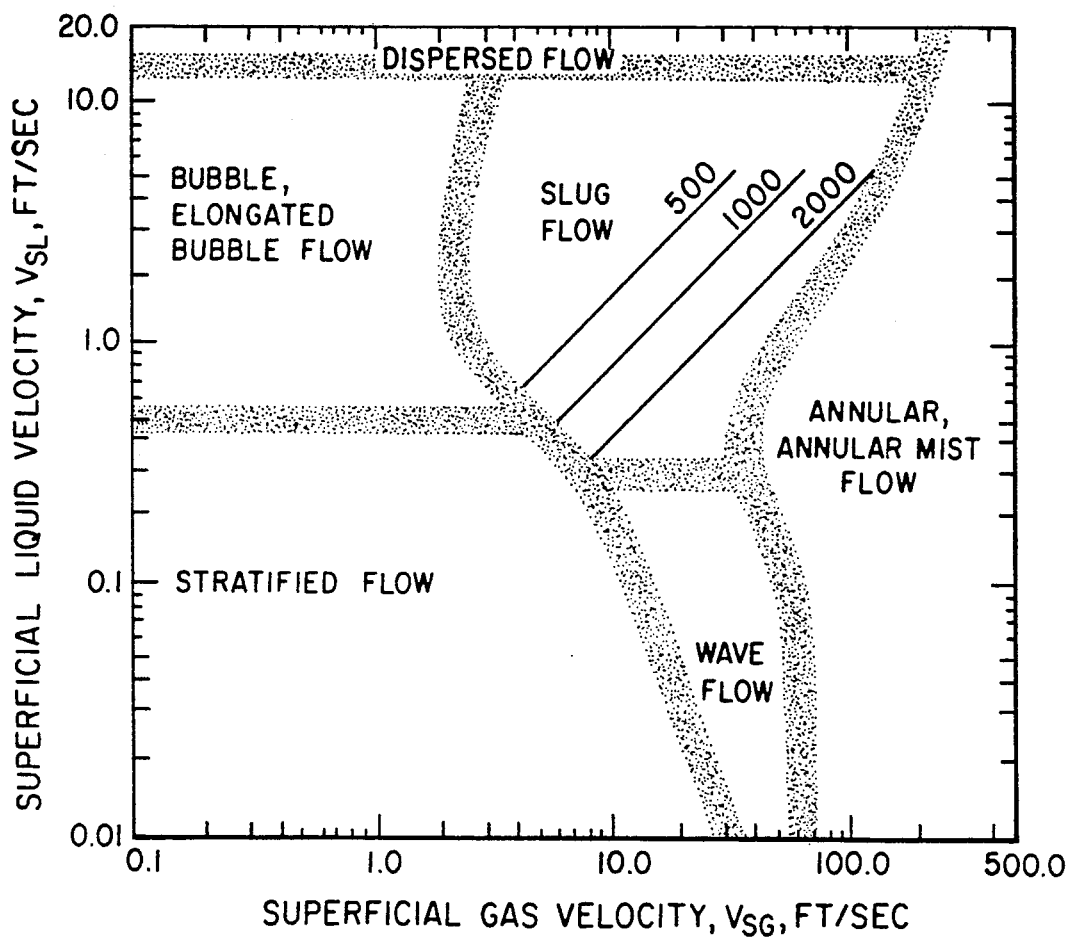

Referring to FIG. 4, slug flow in a horizontal or near horizontal pipeline often occurs when the higher velocity gas flowstream creates a wave on the surface of the slower moving liquid flowstream. If the superficial gas and liquid velocities are in a particular range, as indicated in FIG. 4, slug flow will occur. By definition, superficial velocities are those for each fluid which would occur if the other fluid was not present in the pipe. Nevertheless, FIG. 4 is useful for predicting when slug flow may occur. The slug flow regime is one wherein the superficial gas velocity substantially exceeds the superficial liquid velocity by a factor of about 10 to 1 or more. FIG. 4 also illustrates lines of constant gas flow to liquid flow ratios on a volume basis, which lines are designated by the numerals 500, 1000 and 2000, by way of example.

In some multi-phase fluid flow conditions, slug flow will be present at the beginning of flow entry into a generally horizontal pipeline such as a fluid production pipeline extending from the wellhead of an oil production well. Under certain other flow conditions, slug flow will commence at some point in the pipeline due to the change in gas and liquid flow velocities wherein, initially, a wave is generated which grows in height until it eventually bridges the cross-sectional flow area of the pipe and a slug of liquid flow is thereby generated. This slug flow may be prevented or mitigated by placing a generally horizontally extending partition within the interior of the pipe.

Referring to FIG. 1, there is illustrated a section of generally cylindrical pipe 10 which has been cut away at 12 to illustrate the disposition of a generally flat plate partition 14 extending within the pipe and disposed in a generally horizontal plane therewithin. The partition 14 may be provided in spaced segments, as illustrated in FIG. 1, with a relatively short gap or space 16 between each partition member. The partitions 14 are adapted to divide the interior of the pipe section 10 into a gas flow space 18 and, below the partition, a liquid flow space 20. The vertical placement of the partition 14 within the interior of the pipe section 10 is determined in accordance with the expected volume of gas and liquid flow and the fluid properties of both the gas and the liquid, such as density, viscosity, and expected temperature and pressure conditions.

The ideal interface between the gas and liquid flow spaces formed by the partition 14 is most effective when it is placed within the pipe 10 at a position where the pressure decrease due to the gas flow in the space 18 is substantially equal to the pressure decrease due to the liquid flowing through the space 20. Accordingly, the partition 14 is located in a vertical position with respect to the inside diameter "d" at a position which is a fraction of the inside diameter, as indicated in drawing FIG. 1 by the quantity "xd". The location of the partition 14 may be determined by a set of relationships wherein it is assumed that the pressure decrease or loss due to flow of the gas and liquid through the spaces 18 and 20, respectively, are set equal to each other, equation (a). For purposes of determining the pressure losses it may be assumed that friction pressure losses are dominant, although certain kinetic and elevation or static head losses may occur. Accordingly, it may be acceptable to substitute the Darcy formula (equation b) set forth below for both gas and liquid.

$$\Delta P_g = \Delta P_l \tag{a}$$

$\Delta P_g$ is the pressure loss due to the flow of gas and $\Delta P_l$ is the pressure loss of the liquid flowing through space 20. The Darcy formula for these pressure losses is as follows:

$$0.001294 \, fL\rho_g v_g^2 / D_{18} = 0.001294 \, fL\rho_l v_l^2 / D_{20} \tag{b}$$

where f is the friction factor, L is the pipe length in feet, $\rho_g$ and $\rho_l$ are the densities of gas and liquid in pounds per cubic foot, $v_g$ and $v_l$ are the velocities of the gas and liquid, respectively, and $D_{18}$ and $D_{20}$ are the equivalent diameters of the spaces 18 and 20, respectively.

The equivalent diameters or so-called hydraulic diameters of the spaces 18 and 20 may be determined from the equation for hydraulic diameters in non-circular ducts wherein:

$$D = 3A/P_w \tag{c}$$

where A is the cross-sectional area of the space in question, and $P_w$ is the wetted perimeter, that is, the unit length of wall in contact with the flowing fluid.

The above-mentioned equations include more unknowns than may be solved by substitution. Accordingly, an iterative process may be used to solve equations (b) and (c) in terms of the equivalent diameters of the cross-section of the spaces 18 and 20 and the position of the partition 14 as a fraction of the inside diameter of the pipe 10. Since the volume flow rates of liquid and gas are assumed at the onset of determining the position of the partition 14, the velocities of the respective fluids may be also assumed on the basis of the anticipated cross-sectional flow area of the spaces 18 and 20, respectively.

Figure 2:
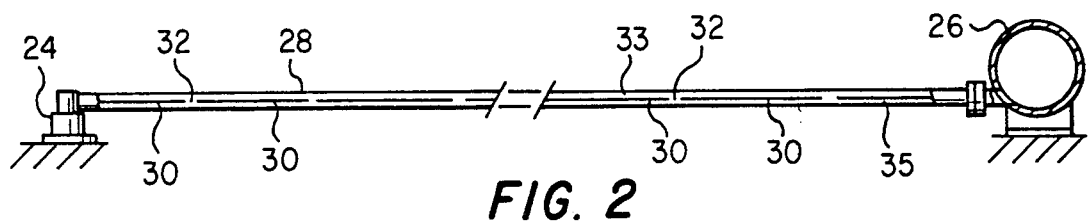
FIG. 2 is a schematic diagram of one embodiment of the slug mitigation conduit or pipe in accordance with the invention.

Referring now to FIG. 2, there is illustrated one embodiment of a system for conducting a multi-phase fluid flowstream of liquid and gas from a fluid-producing well 24 to a process or separator vessel 26. Conduit 28 is of circular cross-section and is conventional fluid conducting cylindrical pipe. It is anticipated that multi-phase, gas and liquid flow will emanate from the well 24 and will be capable of producing slug flow at the onset of introduction into the conduit 28. Accordingly, the conduit 28 has plural spaced-apart, generally flat plate partition sections 30 extending throughout the length of the conduit 28. These partitions are separated by small gaps 32 which, by way of example, may be on the order of about one inch whereas the length of the partitions themselves may be on the order of about ten feet for cylindrical pipe having nominal 2" inside diameter. The small gaps 32 between each partition section 30 allow liquid which may have been entrained with gas flow in the upper section 33 of the pipe 28 to drain into the lower section 35 which is conducting primarily liquid flow.

Figure 3:
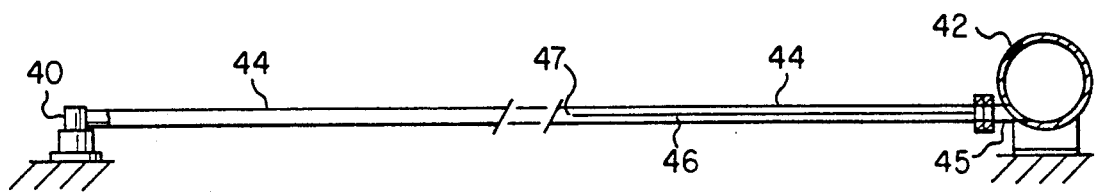
FIG. 3 is a schematic diagram of an alternate embodiment of the invention.

FIG. 3 illustrates a system for mitigating slug flow wherein a wellhead 40 is connected to a process or separator vessel 42 by a cylindrical pipe conduit 44 which has a continuous length of partition 46 interposed therein. The partition 46 is required to extend only over the length of the pipe 44 in accordance with the above-mentioned relationship when it is anticipated that slug flow may occur in the pipe 44 somewhere between the wellhead 40 and the process vessel 42 and slug flow is not necessarily expected to occur at the beginning of fluid introduction into the pipe 44. Such a situation may occur, for example, wherein the pipe 44 is a so-called common line which gathers fluid from several wells at points wherein the increasing flow of oil and gas in the pipe eventually places the flow condition in the slug flow regime indicated in FIG. 4. In such a condition, it is important to place the partition 46 in the pipe 44 extending over a distance up to the inlet 45 of the vessel 42 sufficient to prevent slug flow into the vessel, for example. Slug flow upstream of the leading edge 47 of the partition may or may not occur or be of any concern. It is indicated that the partition length may need to be on the order of 400 to 500 times the pipe inside diameter "d".

Those skilled in the art will recognize from the above-described features and advantages of the present invention that a unique, yet mechanically uncomplicated slug flow prevention or mitigation device is provided for cylindrical as well as non-cylindrical pipes or conduits. The device is particularly useful for preventing slug flow from occurring in horizontal or near horizontal conduits. The partition provided by the device may be constructed of any type of material and since it is not a pressure-bearing member, its only purpose being to provide an ideal interface between the gas and liquid, its structural integrity is not of major concern. As pointed out above, the flat plate type partition does not need to be continuous over the entire length of the conduit in order to eliminate or mitigate slug flow. The provision of a slug flow mitigation device, such as described above, in horizontal or near horizontal pipelines will allow the provision of larger diameter pipes or conduits than has been experienced in the prior art. The elimination of slug flow will not alleviate the concerns for mechanical integrity of the conduits and related fluid handling equipment which, in the prior art, were limited in size to reduce the mechanical forces and stresses imposed by slug flow.

Although preferred embodiments of the invention have been described above in detail, those skilled in the art will recognize that various substitutions and modifications may be made without departing from the scope and spirit of the invention as set forth in the appended claims.

What is claimed is:

1. A slug flow mitigation device for a horizontal or near horizontal pipe which is conducting predetermined quantities of gas and liquid, as multiphase fluid flow, said slug flow mitigation device comprising:

a partition interposed in said pipe and dividing said pipe into a liquid flow space and a gas flow space, said partition comprising a substantially flat plate extending substantially horizontally across the cross-section of said pipe and extending a predetermined length of said pipe to form an interface between liquid flow and gas flow in said pipe, said partition being disposed in a predetermined position in said pipe based on the predetermined quantities of gas and liquid flow in said pipe such that the friction pressure loss in said gas flow space is substantially equal to the friction pressure loss in said liquid flow space through said predetermined length of said pipe 2. The invention set forth in claim 1 wherein: said partition comprises a plurality of partition segments having small spaces interposed between said segments to allow liquid in the gas flow space to flow into the liquid flow space.

3. The invention set forth in claim 1 wherein: said partition extends longitudinally in said pipe about 400 to 500 times the equivalent inside diameter of said pipe.

* * * * *